(12) United States Patent
Yang

(10) Patent No.: US 6,375,323 B1
(45) Date of Patent: Apr. 23, 2002

(54) FOLDABLE EYEWEAR WITH MECHANISM FACILITATING QUICK OPENING

(75) Inventor: Thomas Yang, Elmhurst, NY (US)

(73) Assignee: Stanley Schleger, North Hills, NY (US)

( * ) Notice: Subject to any disclaimer, the term of this patent is extended or adjusted under 35 U.S.C. 154(b) by 0 days.

(21) Appl. No.: 09/469,089

(22) Filed: Dec. 21, 1999

Related U.S. Application Data

(60) Provisional application No. 60/113,639, filed on Dec. 23, 1998.

(51) Int. Cl.7 .................................................. G02C 5/14
(52) U.S. Cl. .............................. 351/111; 381/63; 2/454
(58) Field of Search .............................. 351/111, 112, 351/41, 158, 63; 2/454

(56) References Cited

U.S. PATENT DOCUMENTS

| | | |
|---|---|---|
| 1,024,275 A | 4/1912 | Morton |
| 1,973,648 A * | 9/1934 | Nagel ........................ 351/112 |
| 2,853,924 A | 9/1958 | Herzfeld et al. |
| 2,967,325 A | 1/1961 | Herzfeld |
| 2,975,426 A | 3/1961 | Rabb |
| 3,395,964 A | 8/1968 | Nieder |
| 3,533,687 A | 10/1970 | Herzig |
| 4,050,785 A | 9/1977 | Auge |
| 4,309,086 A | 1/1982 | Lhospice |
| 5,028,126 A * | 7/1991 | Takeuchi ..................... 351/63 |

* cited by examiner

Primary Examiner—Hung Xuan Dang
(74) Attorney, Agent, or Firm—Ostrolenk, Faber, Gerb & Soffen, LLP

(57) ABSTRACT

Eyewear which comprises a frame front and a first and second hinge coupled to the frame front. A first and second temple are pivotably coupled to the frame front through the first and second hinge respectively. The first and second temples are movable between a closed position and a use position. The first and second hinges bias the first and second temples toward the use position. At least a first catch is disposed on the eyewear. The catch is operable to retain the temples in the closed position in opposition to the biasing of the first and second hinges.

13 Claims, 8 Drawing Sheets

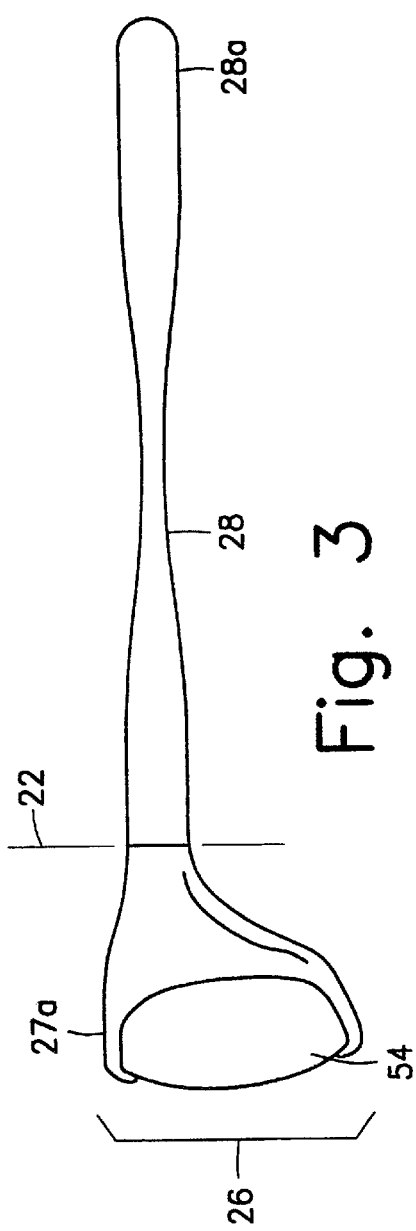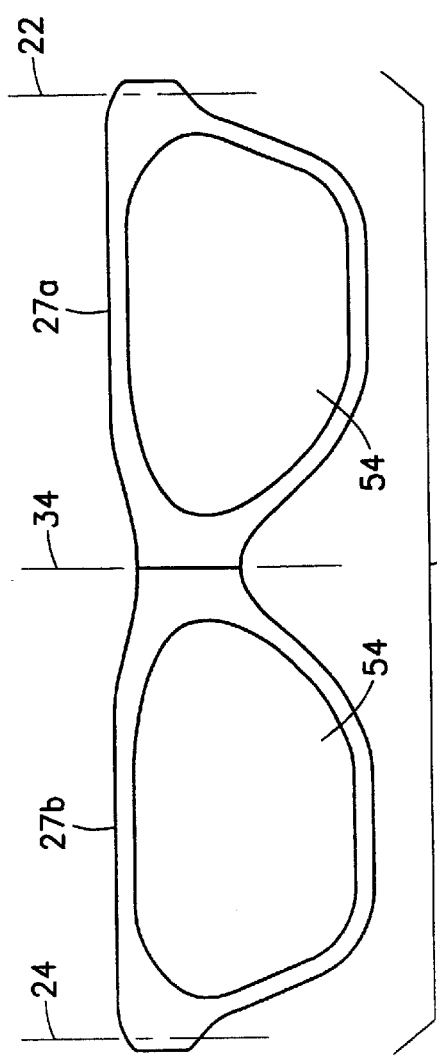

FOLDABLE EYEWEAR WITH MECHANISM FACILITATING QUICK OPENING

CROSS-REFERENCE RELATED APPLICATIONS

This application claims priority to provisional application No. 60/113,639 filed Dec. 23, 1998.

BACKGROUND OF THE INVENTION

The invention relates to eyewear and, more particularly, to eyewear having a mechanism which allows a user to quickly open the eyewear.

Users of eyewear, e.g., eyeglasses, necessarily have to place the eyewear on their face and remove them from their face from time to time. When the eyewear is removed to be stored, temples extending on either side of a front of the eyewear frame are each folded toward the front of the frame to thereby make the eyewear arrangement more compact. Every time a user wishes to wear the eyewear, after the temples have been folded, the user must unfold each arm before the eyewear can be placed on the user's face.

Prior art glasses, like that shown in U.S. Pat. No. 2,853,924 to Herzfeld, provide a biased hinge coupling the temples and the front of the eyeglass fame. If the glasses are stored in a case, when the user removes the glasses from the case, the temples are acted upon by the hinges and caused to open to a position of use. However, this arrangement is not beneficial if the glasses are not stored in a case as the temples are always biased to the use position. A user of the Herzfeld device could not, for example, fold the temples on the front of the frame, and place the glasses on a desk because the hinges would force the temples open.

Other prior art glasses, like those shown in U.S. Pat. No. 4,050,785 to Auge, and U.S. Pat. No. 1,024,275 to Morton, provide a means for retaining temples in the folded position. However, these references are devoid of a function for quickly opening the temples to a use position. Further, there is no suggestion in these references for providing such a functionality.

Thus, there exists a need in the art for eyewear which can be opened quickly to a use position and which can also remain in a closed position without requiring an external force to be applied on the eyewear to stay in the closed position.

SUMMARY OF THE INVENTION

In one aspect of the invention, eyewear comprises a frame front and a first and second hinge, the first and second hinges being coupled to the frame front. A first temple is pivotably coupled to the frame front through the first hinge. A second temple is pivotably coupled to the frame front through the second hinge. The first and second temples are movable between a closed position and a use position. The first and second hinges bias the first and second temples toward the use position. At least a first catch is disposed on the eyewear. The catch is operable to retain the temples in the closed position in opposition to the biasing of the first and second hinges.

This aspect, as well as others, will become apparent upon reading the following disclosure and corresponding drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown.

FIG. 1 is a front view of the eyewear of the invention;

FIG. 3 is a left side view of the invention;

DETAILED DESCRIPTION OF THE INVENTION

Figure 2:
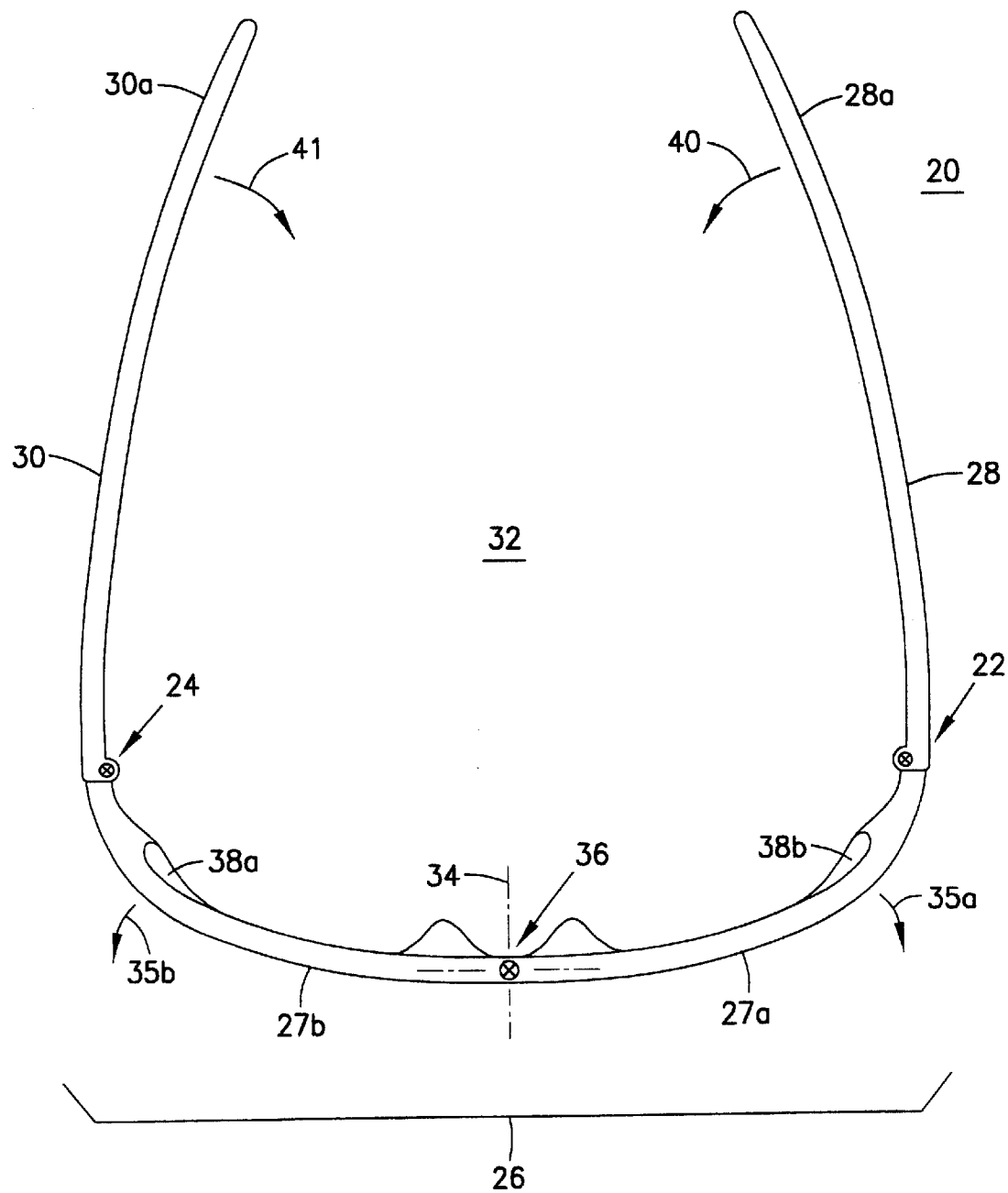
FIG. 2 is a top view of the invention.

Referring to FIG. 1, a frame of a pair of eyeglasses or eyewear is shown generally at 20, comprises a frame front 26 which is effective to hold two lenses 54. Frame front 26 comprises a left frame front 27a and a right frame front 27b, each defined by an axis 34 that bifurcates glasses 20 into symmetrical portions. Frame front 26 is resilient and flexible so that upon the introduction of a pivoting force, left and right frame fronts 27a,b can be pivoted about axis 34 with respect to each other and upon removal of such a force, left and right frame fronts 27a, 27b move back to their original positions. This flexibility and resiliency of frame front 26 could be effectuated by, for example, a hinge 36—as is shown in FIG. 2 or by making the frame front 26 sufficiently flexible, particularly at axis 34. Alternatively, as described herein, the temples can be made flexible so as to allow them to be received in and removed from respective catches (discussed below). Although two lenses 54 are shown in frame front 26, the present invention also applies to any number of lenses held by frame front 26 including a single lens or a plurality of lenses other than two. Further, the frame front can be integral with the lens or lens portions.

Referring now also to FIGS. 2 and 3, frame front 26 is pivotably coupled to a left temple 28 and a right temple 30 through a left temple hinge 22 and a right temple hinge 24, respectively. Left temple 28 includes a left distal end 28a. Similarly, right temple 30 includes a right distal end 30a. Left and right temple hinges 22, 24 each include a spring (not explicitly shown) which causes the temples 28, 30 to bias outwardly toward a use position 32 as shown in FIG. 2.

Figure 4:
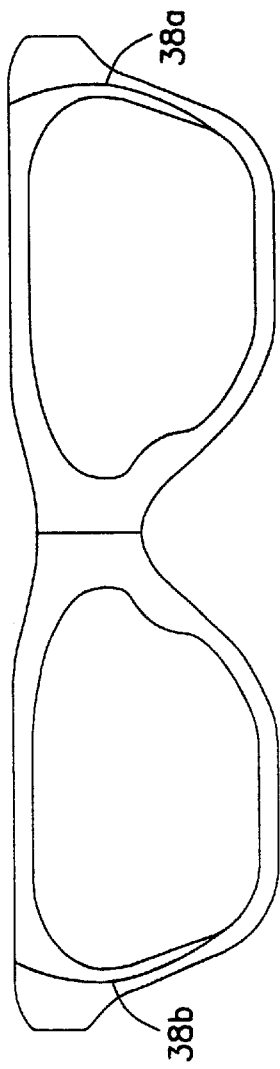
FIG. 4 is a rear view of a first embodiment of the invention.
Figure 5:
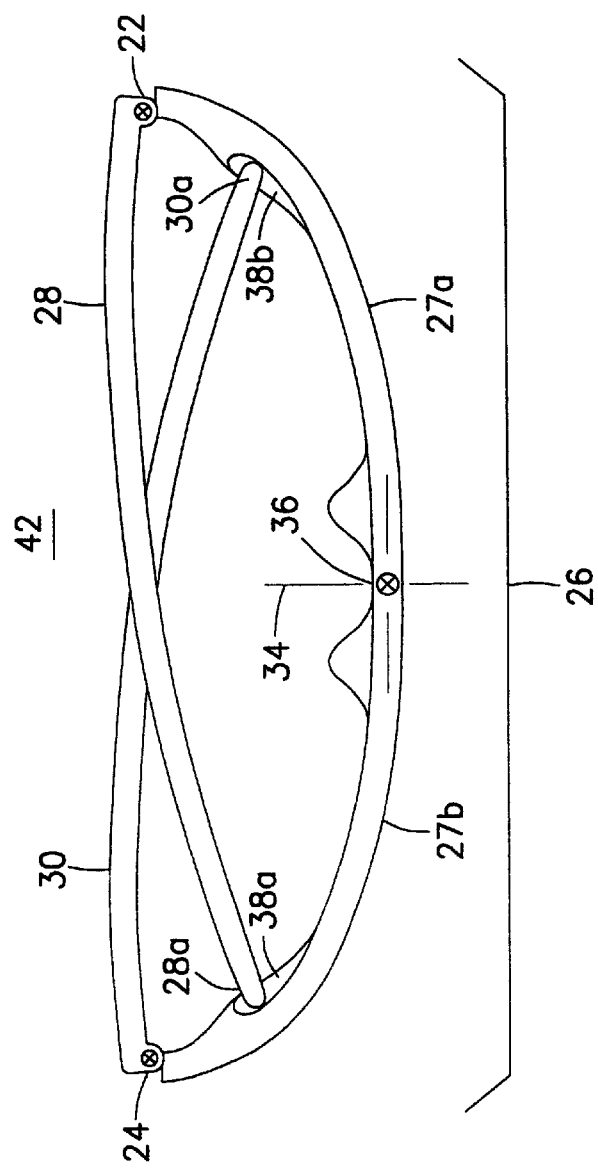
FIG. 5 is a top view showing the first embodiment of the invention in a closed position.

The invention provides a user with the convenience of a being able to quickly open the eyewear from a closed position while also not requiring the user to keep the eyewear in the closed position stored in a container. Referring to FIGS. 2, 4 and 5, frame front 26 further includes two catches 38a,b disposed on opposite sides of an interior of frame front 26. Catches 38a,b may be molded into frame front 26 and may be in the shape of a lip with a concave shaped cross-section as is seen most clearly in FIGS. 2 and 5. Catches 38a,b could also be in the form of a groove or ridge or any other suitable catching mechanism, formed integrally or non-integrally with frame front 26.

Figure 6:
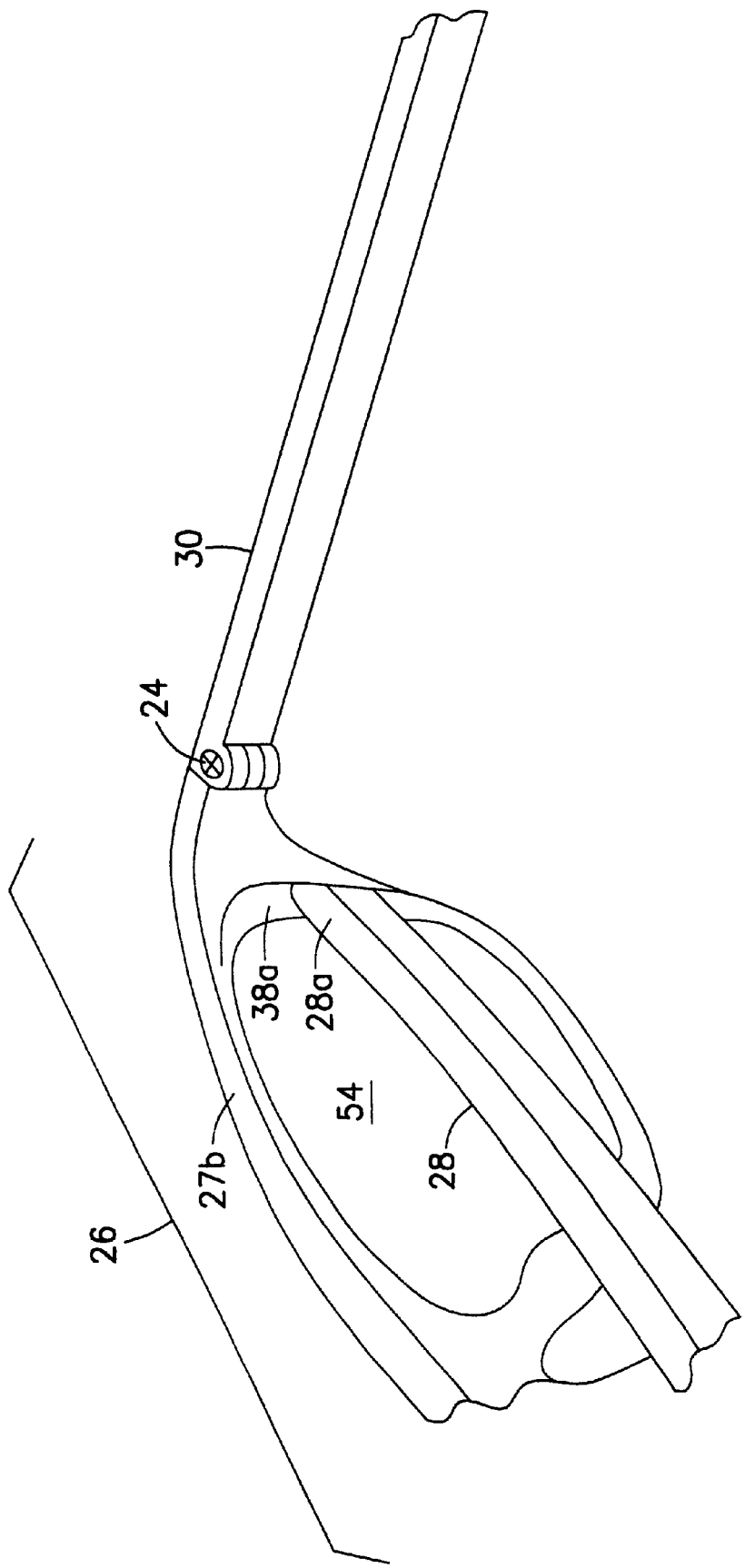
FIG. 6 is a rear, overhead, perspective view showing a temple of a pair of eyewear in a closed position in accordance with the first embodiment of the invention.

When a user desires to store eyewear 20 in a closed position, the user folds temples 28, 30 of eyewear 20 against the biasing force of spring loaded hinges 22, 24 toward frame front 26 in directions 40, 41 (shown in FIG. 2). As temples 28, 30 are folded, the user further pivots left and right frame front 27a,b about axis 34 in direction 35a and 35b respectively, thereby enabling catches 38a, 38b to receive left and right distal ends 28a, 30a of left and right temples 28, 30. Once left and right distal ends 28a, 30a are received in catches 38a, 38b respectively, the user releases or refrains from pivoting left and right frame front 27a,b about axis 34 and the resiliency of frame front 26 causes left and right frame front 27a, 27b to resume their original position. Now, left and right temple 28, 30 are securely held folded to frame front 26 in a closed position 42 against the biasing force of left and right temple hinges 22, 24 through the engagement of left and right distal ends 28a, 30a with respective catches 38a, 38b as is shown most clearly in FIG. 5. FIG. 6 shows left temple 28 folded and held in place by catch 38a only while right temple 30 is shown unfolded.

Figure 7:
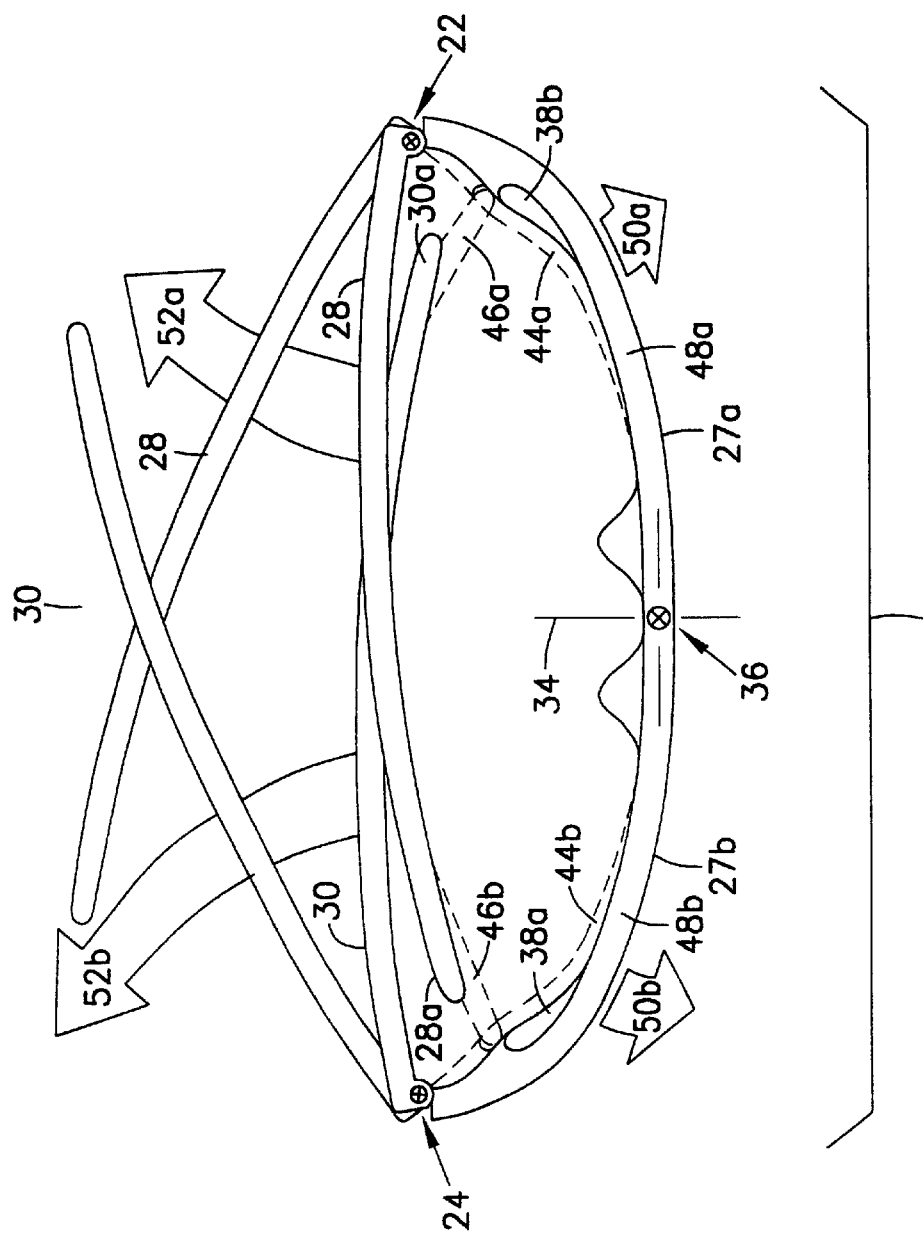
FIG. 7 is a top view detailing the opening of glasses in accordance with the first embodiment of the invention.

If a user wishes to wear the glasses after they have been folded, glasses 20 need to be manipulated between closed position 42 shown in FIG. 5 and use position 32 shown in FIG. 2. Referring now to FIG. 7, when glasses 20 are in closed position 42, left and right frame front 27a, 27b assume positions 44a and 44b (shown in phantom), respectively. When left and right frame fronts 27a, 27b are in positions 44a, 44b, catches 38a and 38b retain left and right distal ends 28a, 30a in positions 46a, 46b (shown in phantom) respectively. By simply pivoting left frame front 27a and right frame front 27b about axis 34 in directions 50a and 50b, and not applying a force to temples 28, 30 left frame front 27a assumes position 48a and right frame front 27b assumes position 48b. This pivoting in directions 50a,b, causes catches 38a and 38b to move outwardly. When catch 38b clears left distal end 28a and catch 38a clears right distal end 30a, left and right distal ends 28a and 30a are thereby released from the respective catches, and spring biased hinges 22, 24 act upon temples 28, 30 respectively to cause temples 28, 30 to move in directions 52a and 52b respectively until glasses 20 assume use position 32 (as shown in FIG. 2).

While the embodiment shown shows two catches 38a and 38b, only one catch need be used because the temple which is not received in a catch can be folded first underneath the temple receivable in a catch.

Figure 8:
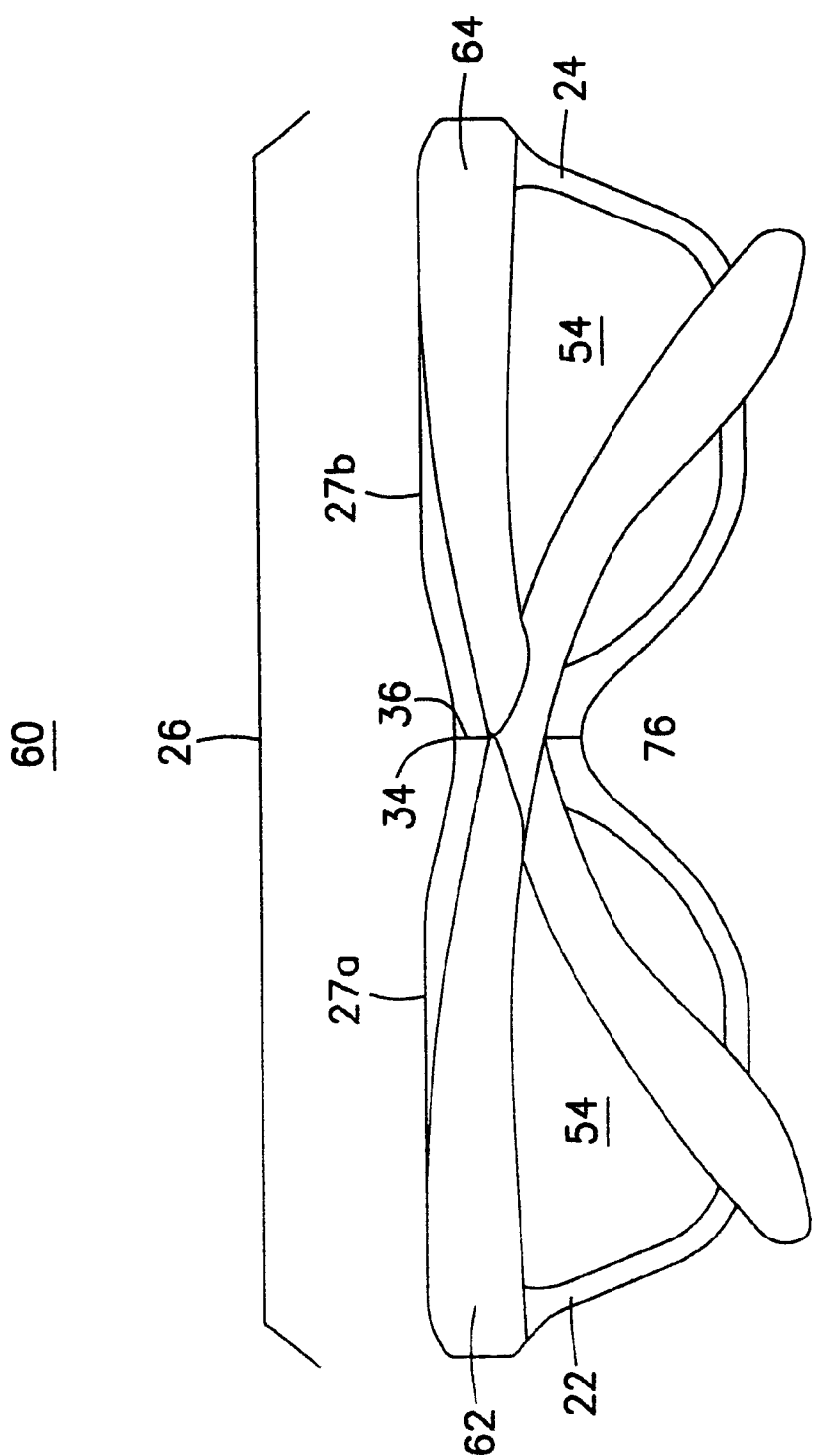
FIG. 8 is a rear view of a second embodiment of the invention.
Figure 9D:
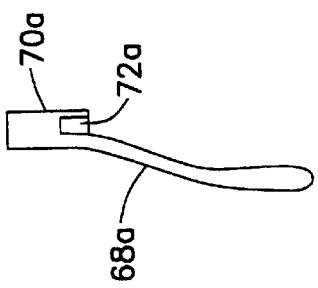
FIG. 9D is a top perspective cut away view looking down the length of a temple in accordance with the second embodiment of the invention.
Figure 9A:
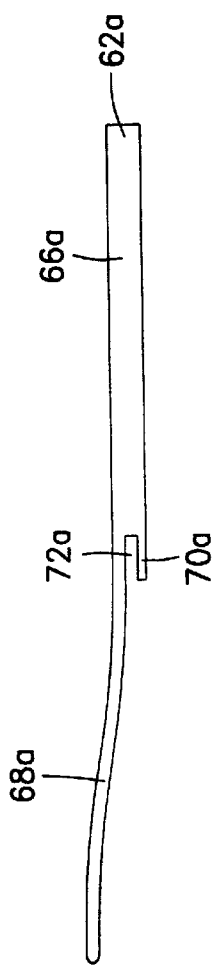
FIG. 9A is a top view of a temple in accordance with the second embodiment of the invention.
Figure 9B:
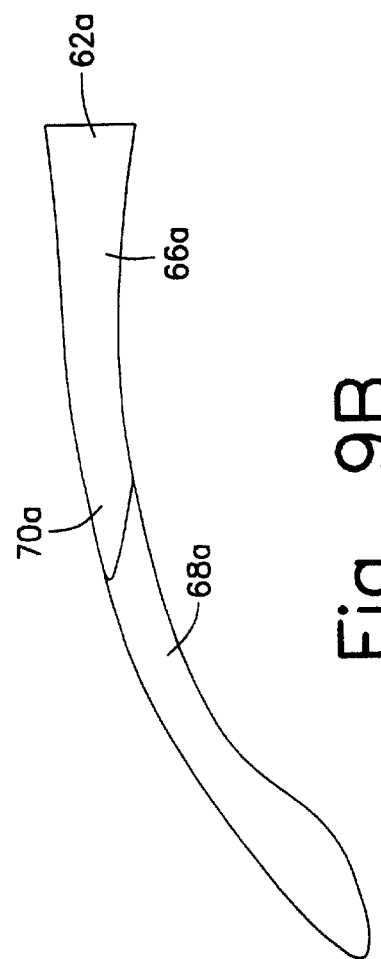
FIG. 9B is a front view of a temple in accordance with the second embodiment of the invention.
Figure 9C:
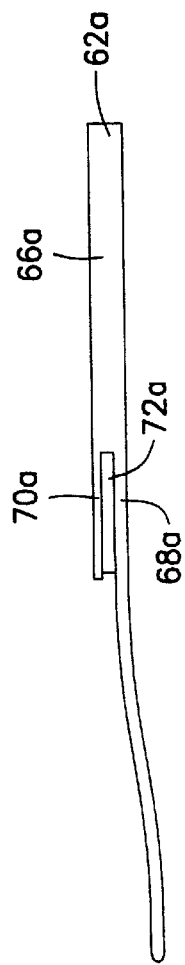
FIG. 9C is a bottom view of a temple in accordance with the second embodiment of the invention.

In FIG. 8, there is shown a second embodiment of the invention. Elements which are similar to the first embodiment are shown with like reference numerals and discussion of these elements is therefore omitted unless necessary to elucidate the features of this embodiment. Glasses of the second embodiment are shown generally at 60. Glasses 60 include front face 26 coupled to a left temple 62 and a right temple 64 through spring loaded hinges (not shown) as with glasses 20. Left and right temples 62, 64 can be identical.

Referring to FIGS. 9A–9D, there is shown left temple 62, it being understood that if left and right temples 62, 64 are identical, the following illustration describes right temple 64 as well. To improve clarity, elements on temple 62 will be referred to with a sub-reference "a" and similar elements on temple 64 will be described with a sub-reference "b". Left temple 62 includes a base portion 66a that is integral with a first extension 68a and second extension 70a. First and second extension 68a, 70a define a recess 72a therebetween. Recess 72a serves as the catch for this embodiment. As can be discerned, second extension 68a extends much further than first extension 70a and defines the remainder of temple 62a which begins generally with base portion 66a.

Figure 10A:
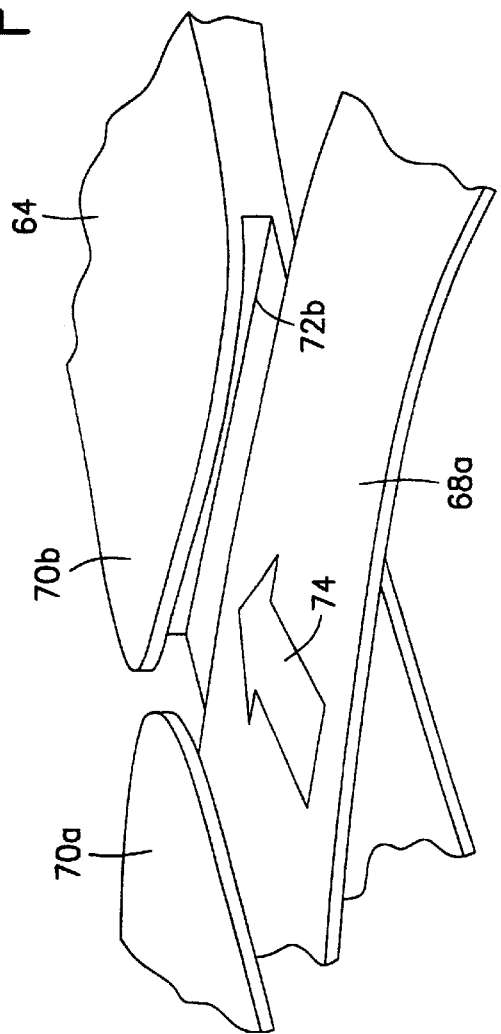
FIGS. 10A and 10B are perspective views showing the mating and locking engagement of temples in accordance with the second embodiment of the invention.
Figure 10B:
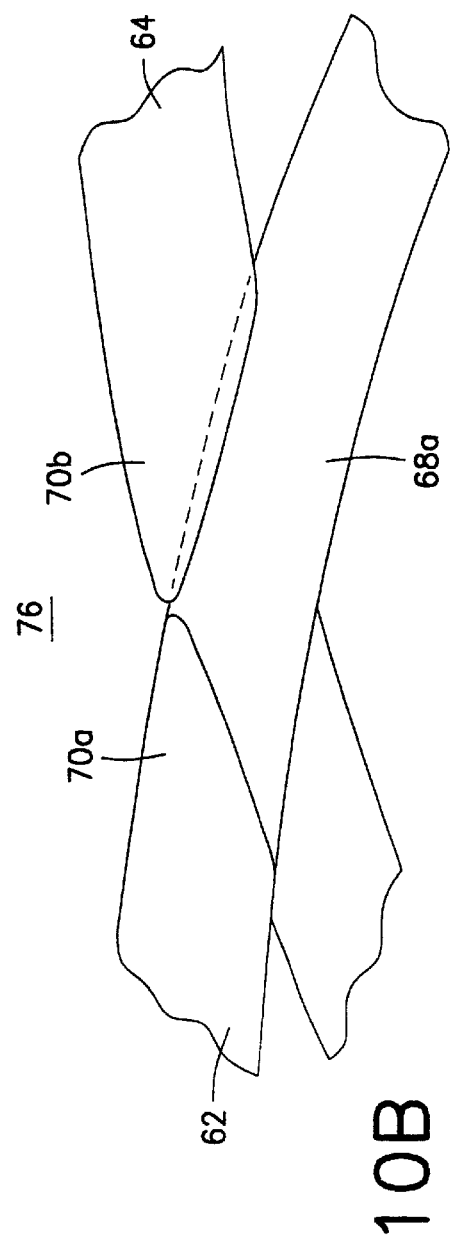

Referring now also to FIGS. 10A and 10B, when a user of glasses 60 wishes to store glasses 60 in a closed position, the user again folds temples 62, 64 against the biasing force of spring loaded hinges 22, 24 toward frame front 26. As temples 28, 30 are folded, the user further pivots left and right frame front 27a,b about axis 34 in directions 35a, 35b (FIG. 2). This pivoting enables either one of the first extensions 68, on a first one of the temples 62, 64, to approach recess 72 of a second one of the temples 62, 64. As the temples can be symmetrical, it does not matter which temple provides the recess and which provides the first extension. For illustration, FIG. 10A shows first extension 68a of left temple 62 being placed near recess 72b of right temple 64. At this point, the user releases or refrains from pivoting left and right frame front 27a,b about axis 34 and the resiliency of frame front 26 causes left and right frame front 27a, 27b to resume their original position. This causes first extension 68a to move toward recess 72b in direction 74 and recess 72b to receive first extension 68a and frictionally maintains it therein. This arrangement keeps temples 62, 64 in a closed locked position 76 against the biasing force of hinges 22, 24.

As with glasses 20, to open glasses 60, left frame front 27a and right frame front 27b are again pivoted about axis 34 without a user applying a force to temples 62, 64. This causes first extension 68a to be removed from recess 72b. Now the biasing force of hinges 22, 24 is uninhibited and temples 62, 64 are moved to the use position as above.

While the embodiment shown shows temples 62, 64 being formed identically, only one of these temples needs recess 72a or 72b to receive a part of the other of temple 62, 64.

Although the two embodiments shown describe a frame front that is flexible at axis 34, the frame front need not be flexible if the temples are flexible enough to be received in the catches 38a, 38b, 72a, 72b. For example, in a third embodiment, if the temples are made sufficiently flexible, they can be snapped into their respective catches. Still further, the frame front and temples need not be flexible if sufficient flexibility against the action of a biasing force, e.g., a spring, is built into the hinges 22 and 24 to enable the temples to be snapped into and out of their respective catches.

Thus, by providing a spring loaded hinge to bias temples toward a use position and providing a catch to keep the temples in a closed position, the problems of the prior art are solved. A user can quickly open up his glasses and move them to a use position. Yet, the user need not store the glasses in a case while the glasses are in a folded position.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. Eyewear comprising:

a frame front;

a first and second hinge, said first and second hinges being coupled to said frame front;

a first temple pivotably coupled to said frame front through said first hinge;

a second temple pivotably coupled to said frame front through said second hinge;

said first and second temples being movable between a closed position and a use position, said first and second hinges biasing said first and second temples toward said use position; and at least a first catch, disposed on said eyewear, said catch being operable to retain said temples in said closed position in opposition to said biasing of said first and second hinges;

and further wherein said first temple comprises:

a base portion;

a first extension extending from said base portion;

a second extension extending from said base portion, said first and second extension defining said catch therebetween;

whereby said first and second temples are retained in said closed position by inserting a part of said second temple into said catch, so that said first and second temples cross each other in said closed position.

2. The eyewear as claimed in claim 1, wherein said second temple further comprises:

a base portion;

a first extension extending from said base portion; and a second extension extending from said base portion, said first and second extension defining another catch therebetween;

whereby said another catch is effective to retain said first and second temples in said closed position by inserting a part of said first temple in said another catch.

3. The eyewear as claimed in claim 1, wherein said frame front includes a first frame portion and a second frame portion, said second frame portion being flexibly coupled to said first frame portion.

4. The eyewear as claimed in claim 3 wherein said catch and said temples are arranged so that pivoting said first frame portion with respect to said second frame portion allows said second temple to be placed in and removed from said catch.

5. The eyewear as claimed in claim 1, wherein said frame front further comprises at least one lens.

6. Eyewear comprising:

a frame front;

a first and second hinge, said first and second hinges being coupled to said frame front;

a first temple pivotably coupled to said frame front through said first hinge;

a second temple pivotably coupled to said frame front through said second hinge;

said first and second temples being movable between a closed position and a use position, said first and second hinges biasing said first and second temples toward said use position; and at least a first catch, disposed on said eyewear, said catch being operable to retain said temples in said closed position in opposition to said biasing of said first and second hinges;

and further wherein said catch is disposed on said frame front at at least one location so that said catch is effective to receive one of said first and second temples when said one of said first and second temples is placed in said closed position.

7. The eyewear as claimed in claim 6, wherein said catch is disposed on said frame front at two locations so that said catch is effective to receive both said first and second temples when said first and said second temples are placed in said closed position.

8. The eyewear as claimed in claim 7, wherein said catch comprises two catches each for receiving a distal end of a respective temple.

9. The eyewear as claimed in claim 6, wherein said frame front includes a first frame portion and a second frame portion, said second frame portion being flexibly coupled to said first frame portion.

10. The eyewear as claimed in claim 9, wherein said catch and said temples are arranged so that pivoting said first frame portion with respect to said second frame portion allows said temples to be placed in and removed from said catch.

11. The eyewear as claimed in claim 10, wherein said frame front further comprises at least one lens.

12. The eyewear as claimed in claim 6, wherein at least one of said temples is flexible so as to be receivable in said first catch.

13. Eyewear comprising:

a frame front;

a first and second hinge, said first and second hinges being coupled to said frame front;

a first temple pivotably coupled to said frame front through said first hinge;

a second temple pivotably coupled to said frame front through said second hinge;

said first and second temples being movable between a closed position and a use position, said first and second hinges resiliently biasing said first and second temples toward said use position; and first and second catches for each of said temples, disposed on said eyewear, said catches being operable to retain said temples in said closed position in opposition to said biasing of said first and second hinges;

further wherein said first and second temples are flexible so as to be received in respective ones of said catches, and further wherein said catches are disposed on said frame front so that said catches are effective to receive respective ones of said first and second temples when said first and second temples are placed in said closed position.

* * * * *